Patented June 26, 1951

2,558,688

UNITED STATES PATENT OFFICE 2,558,688

PROCESS FOR MANUFACTURING CHLORINATED DERIVATIVES OF RESOLS

Miloslav Landa, Most, Czechoslovakia, assignor to Bata, narodni podnik, Zlin, Czechoslovakia No Drawing. Application April 2, 1947, Serial No. 738,909. In Germany April 23, 1941

Section 1, Public Law 690, August 8, 1946
Patent expires April 23, 1961

7 Claims. (Cl. 260—53)

The resols, used for manufacturing varnishes, must be easily soluble in aliphatic and aromatic solvents, vegetable oils, softeners and must be at the same time easily mixable with raw or artificial rubber or chlorined rubber. It is possible to attain the solubility in the above mentioned components of varnishes by using for the manufacturing of resols alkylated, aralkylated, arylated, oxalkylated or chlorinated phenol derivatives. Resins manufactured in such a way are easily soluble in oil, but, when prepared into varnishes that dry out, their antioxydative qualities prove to be disadvantageous and slow down or even quite suppress the drying, as is the case for instance with amylphenol resin.

These difficulties can be overcome by adding a siccative, for instance compounds of cobalt, manganese, or lead, whereby however the possibility of storing the manufactured varnishes is greatly reduced.

It has been found, that by introducing into substituted or unsubstituted phenols one or more aliphatic, un-saturated groups, containing a halogen in the neighbourhood of a double bond, it is possible to prepare a number of new phenol derivatives, that are excellently suitable for manufacture of resols, the properties of which are favourably exhibited in varnishes. As substituted phenols the alkyl, aralkyl, aryl, oxalkyl or halogen phenols should be considered.

Such phenol derivatives, containing an unsaturated group with a halogen in the neighbourhood of a double bond yield upon condensation with aldehydes resins that are easily soluble in vegetable oils and at the same time have no antioxidative effect in a mixture with drying oils.

If the condensation is performed in a closed vessel at a temperature above the boiling point of the mixture, it is possible to proceed without adding a catalyst. Such prepared resins are practically free of electrolytes and can be used directly with vegetable oils for the manufacture of varnishes.

Example 1

455 parts of orthochlorcrotylphenol, prepared from natrium phenolate with 1.3-dichlorbuten-2 is heated in a closed vessel with 400 parts of 40% formaldehyde up to 140° to 200° C. until all of the phenol is bound to the formaldehyde and the resin shows a marked melting point. The upper aqueous layer is removed and the lower resinous layer freed of water, formaldehyde and other non resinous substances. The output is 495 parts of resin.

Example 2

490 parts of paracresol, ortho-substituted by a chlorcrotyl radical is condensed with 400 parts of 40% formaldehyde in a similar way as described for Example 1. The output is 525 parts of resin.

Example 3

455 parts of o-methylchlorallylphenol, prepared by rearranging the phenyl-1-chlorcrotylether, is condensed with formaldehyde in the way described for Example 1. The output is about 500 parts of resin.

The phenols of the preceding examples are seen to be characterized by a 4 carbon atom, aliphatic, unsaturated side chain bearing a chlorine radical on one of the unsaturated carbon atoms.

The resols prepared by this process when mixed with drying oils form varnishes, more resistant to chlorinated hydrocarbons and organic solvents than varnishes prepared from alkylphenols. They also dry much quicker in thin layers with or without siccatives.

I claim:

1. The process of forming an improved, chlorinated, synthetic resin soluble in vegetable drying oil, comprising condensing formaldehyde with a member of the group consisting of phenol and cresol, said member having as the sole substituent a 4 carbon atom, mono-olefinic side chain bearing a chlorine radical on one unsaturated carbon atom, which condensation is effected at about 140°–200° C. until the resulting resin shows a definite melting point.

2. The process of forming an improved, chlorinated, synthetic resin soluble in vegetable drying oil, comprising condensing formaldehyde with 1-chlorocrotylphenol which condensation is effected at about 140°–200° C. until the resulting resin shows a definite melting point, the ratio of reactants being about 455–490 parts of 1-chlorocrotylphenol to about 400 parts of 40% formaldehyde.

3. The process of forming an improved, chlorinated, synthetic resin soluble in vegetable drying oil, comprising condensing formaldehyde with methylchlorallylphenol which condensation is effected at about 140°–200° C. until the resulting resin shows a definite melting point, the ratio of reactants being about 455 parts of methylchloroallylphenol to about 400 parts of 40% formaldehyde.

4. A chlorinated, synthetic resin soluble in vegetable drying oil without substantially impairing the drying qualities of the same, consisting of a condensation polymer of formaldehyde with a member of the group consisting of phenol and cresol, said member having as the sole substituent a 4 carbon atom, mono-olefinic side chain bearing a chlorine radical on one unsaturated carbon atom.

5. A chlorinated, synthetic resin soluble in vegetable drying oil without substantially impairing the drying qualities of the same, consisting of a condensation polymer of formaldehyde with 1-chlorocrotylphenol.

6. A chlorinated, synthetic resin soluble in vegetable drying oil without substantially impairing the drying qualities of the same, consisting of a condensation polymer of formaldehyde with methylchlorallylphenol.

7. The process of forming an improved, chlorinated synthetic resin soluble in vegetable drying oil, comprising condensing formaldehyde with a member of the group consisting of phenol and cresol, said member having as the sole substituent a 4 carbon atom, mono-olefinic side chain bearing a chlorine radical on one unsaturated carbon atom, which condensation is effected at about 140°–200° C. until the resulting resin shows a definite melting point, the ratio of reactants being about 455 to 490 parts of said member to about 400 parts of 40% formaldehyde.

MILOSLAV LANDA.

REFERENCES CITED

The following references are of record in the file of this patent:

UNITED STATES PATENTS

| Number | Name | Date |
| --- | --- | --- |
| 2,006,043 | Dykstra | June 25, 1935 |
| 2,399,735 | Harvey | May 7, 1946 |